(12) United States Patent
Gaigler et al.

(10) Patent No.: US 8,683,697 B2
(45) Date of Patent: Apr. 1, 2014

(54) LARGE SCALE STRUCTURES

(75) Inventors: Randy L. Gaigler, Parkville, MD (US);
Kishan L. Goel, Timonium, MD (US);
Tushar K. Shah, Columbia, MD (US)

(73) Assignee: Lockheed Martin Corporation,
Bethesda, MD (US)

(*) Notice: Subject to any disclaimer, the term of this patent is extended or adjusted under 35 U.S.C. 154(b) by 1010 days.

(21) Appl. No.: 12/767,165

(22) Filed: Apr. 26, 2010

(65) Prior Publication Data

US 2011/0259462 A1    Oct. 27, 2011

(51) Int. Cl.
*B21D 47/00* (2006.01)

(52) U.S. Cl.
USPC .......... 29/897.32; 29/897; 29/897.3; 52/36.1; 52/36.6; 52/27; 52/238.1; 52/239; 52/848

(58) Field of Classification Search
USPC .......... 29/897, 897.3, 897.32; 52/36.1, 238.1, 52/239, 36.4, 36.5, 36.6, 27, 220.2, 233, 52/848, 592.6, 2, 23.7, 223.14
See application file for complete search history.

(56) References Cited

U.S. PATENT DOCUMENTS

| | | | |
|---|---|---|---|
| 4,047,350 A * | 9/1977 | Chisum | 52/592.6 |
| 5,097,643 A | 3/1992 | Wittler | 52/238.1 |
| 5,134,828 A | 8/1992 | Baur | 52/704 |
| 5,165,213 A | 11/1992 | Finch et al. | 52/588 |
| 5,927,346 A | 7/1999 | Majnaric et al. | 138/175 |
| 6,295,764 B1 | 10/2001 | Berridge et al. | 52/36.5 |
| 8,281,528 B2 * | 10/2012 | Clarke | 52/223.7 |

* cited by examiner

*Primary Examiner* — Richard Chang
(74) *Attorney, Agent, or Firm* — Renner Kenner Greive Bobak Taylor & Weber (57) ABSTRACT

A large scale structure includes a plurality of panels, wherein each panel has at least one opening therethrough. And each panel has opposed edge profiles that are positionable next to adjacent panels and opposed end profiles that are positionable next to adjacent panels. A plurality of rods extend through aligned openings so as to interconnect the plurality of panels to one another. And a plurality of coupling nuts, each coupling nut attachable to an end of one of the rods, wherein the coupling nuts secure the panels to one another. An insert with apertures aligned with the openings allows a rod to extend through the insert and facilitate securement of the insert to the plurality of panels so as to form a section. Additional sections can be assembled as needed to form the structure.

11 Claims, 12 Drawing Sheets

LARGE SCALE STRUCTURES

TECHNICAL FIELD

Generally, the present invention is directed to large scale structures and methods for constructing the same. In particular, the present invention is directed to a structure using pre-formed components which allow the structure to be made on site. Specifically, the present invention is directed to a structure made on site and vertically disposed into a large body of water.

BACKGROUND OF THE INVENTION

Construction of large scale structures such as buildings, containment vessels or pipes, can be constructed off site but sometimes are constructed on site. Construction of the structure is typically done where the materials are readily available and can be assembled on site. However, some structures require use of composite materials which are not amenable to on-site construction. Composite materials provide excellent structural properties and compression characteristics as compared to normal construction materials made of wood, brick, steel or cement. Composite materials are also known to have improved strength properties and are lighter in weight than typical construction materials.

An exemplary large structure is proposed for use as a cold water pipe that is part of an ocean thermal energy conversion system. Briefly, such an energy conversion system utilizes the difference between warm surface water and deep cold water to drive a "steam cycle" that turns a turbine and generates electrical power. In order to implement such a system, a large scale pipe must be constructed. These pipes can have diameters of several meters and can be hundreds and even thousands of meters in length. An ideal pipe is believed to be ten meters in outer diameter and one thousand meters in length.

It has been proposed to construct such structures with composite material sandwich panels and various methods have been developed. These methods include manufacture by hand, resin transfer molding, compression molding and/or filament winding. One promising approach is to utilize a vacuum assisted resin transfer molding process wherein a plurality of fabric rollers are disposed in a cylindrical arrangement. Selected lengths of fabric are then pulled down into a molding machine and the resin is impregnated into the fabric rollers in a manner well known in the art. After this portion of the molding is completed, the section is lowered into the water and a next section is molded. This process is repeated until the structure is complete. Another process is to simply construct pre-formed panels in a cylindrical arrangement and secure these panels to one another by hand. This structure is then lowered and joined to another section and the process is completed until the structure is complete.

Although the aforementioned processes are believed suitable for constructing a large scare structure, it is believed that they have a number of shortcomings. Specifically, these aforementioned processes are time consuming and require installation of expensive onsite resin transfer manufacturing equipment for each large scale construction. Therefore, there is a need in the art for a relatively inexpensive, yet reliable method of constructing a large scale structure. There is also a need to utilize component parts that can be easily shipped to the site and then rapidly assembled. There is also a need for a composite structure with interlocking seam joints and butt joints secured to one another under compression with reinforcing materials so as to provide adequate strength for the completed structure.

SUMMARY OF THE INVENTION

In light of the foregoing, it is a first aspect of the present invention to provide large scale tubular structures and methods for constructing the same.

It is another aspect of the present invention to provide a large scale structure comprising a plurality of panels, each panel having opposed edge profiles that are positionable next to adjacent panels, and each panel having opposed end profiles that are positionable next to adjacent panels, and each panel having at least one opening therethrough extending from one end profile to the other end profile, and wherein adjacent panel openings are aligned with each other, a plurality of rods extendable through the aligned openings, and a plurality of coupling nuts, each coupling nut attachable to an end of one of the rods so as to secure the panels to one another.

It is another aspect of the present invention to provide a method for assembling a structure, comprising assembling a coupling nut to one end of a rod, providing a plurality of panels having an opening therethrough, each panel having opposed edge profiles that are positionable next to adjacent panels, and each panel having opposed end profiles that are positionable next to adjacent panels, positioning the rod through the opening of one of the panels to form a rod-panel sub-assembly, positioning a plurality of the rod-panel sub-assemblies so that the edge profiles of adjacent panels are in contact with one another, and securing another coupling nut to an opposite end of each rod.

BRIEF DESCRIPTION OF THE DRAWINGS

This and other features and advantages of the present invention will become better understood with regard to the following description, appended claims, and accompanying drawings wherein:

BEST MODE FOR CARRYING OUT THE INVENTION

Figure 1:
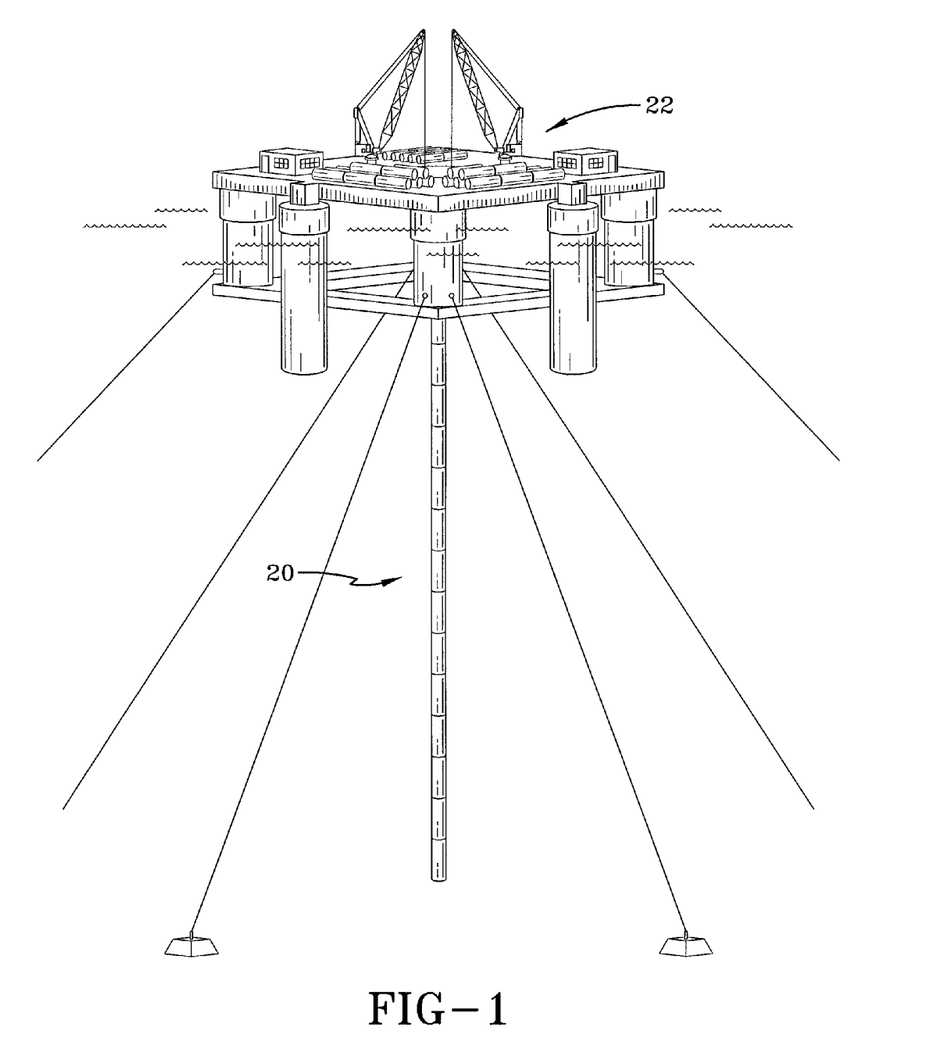
FIG. 1 is a perspective view of an energy conversion system utilizing a large scale tubular structure made in accordance with the concepts of the present invention.

Referring now to the drawings and, in particular to FIG. 1, it can be seen that a large scale structure usable in any number of configurations and environments is designated generally by the numeral 20. In the particular embodiment shown, the large scale structure 20 is a pipe used in conjunction with a water-supported platform 22. The platform 22 is part of an ocean thermal energy conversion system and in the present embodiment the pipe is shown vertically extending downwardly from the platform so as to draw cold water into the system. The system then uses a temperature differential between the cold water and warm surface water to drive a steam cycle that turns a turbine and generates electrical power for storage and/or transmission. Although the present invention is directed to a tubular large scale structure, skilled artisans will appreciate that other large scale structures of various shapes and configurations could be utilized based on the teachings provided herein.

Referring now to FIGS. 2-11, it can be seen that the structure 20 is made up of a plurality of sections 28, wherein each section comprises, at a minimum, a plurality of panels 30, a plurality of internally disposed rods 32 maintained within the panels, and a plurality of coupling nuts which are used to secure the sections 28 to one another. As will be described in further detail below, the sections may also include an insert 36 which separates groupings of panels 30 from one another. The inserts provide stability between sections and are used for securing the sections to one another and/or the panels to one another.

The structure 20 may also include an end piece 38 which is configured similarly to the insert 36 but which provides for an end configuration for the structure and to provide a sealing configuration so as to prevent sea water and/or other debris from entering the internal structural features of the lowermost section 28.

Figure 3:
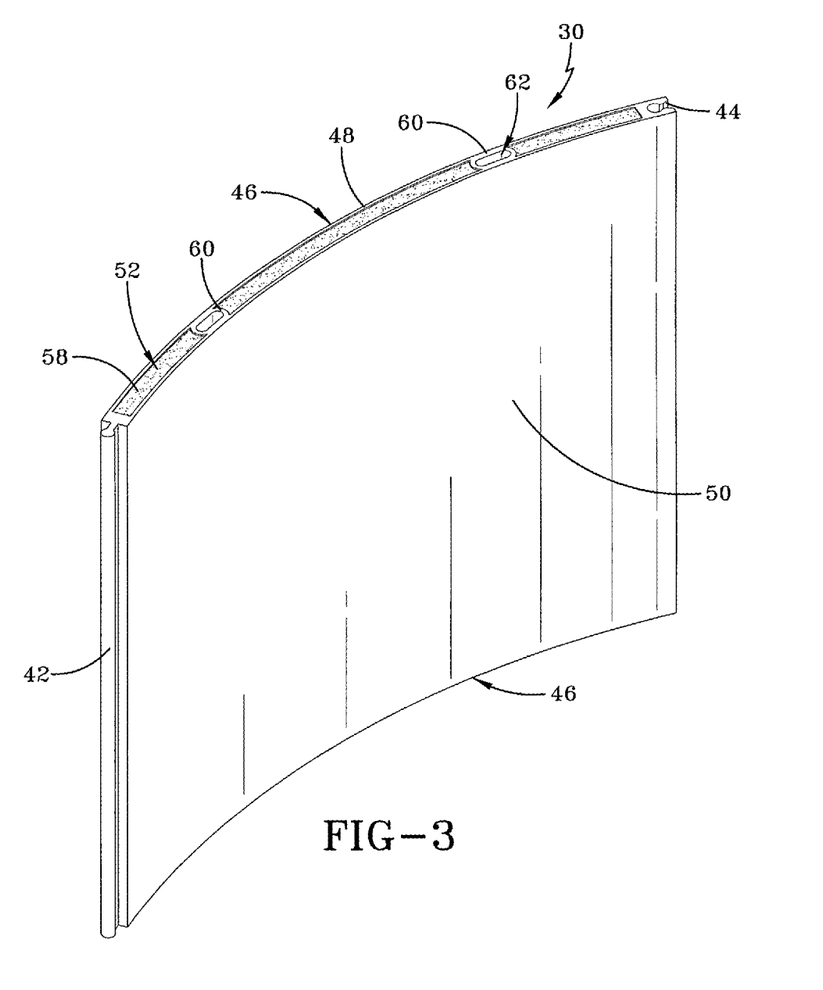
FIG. 3 is a perspective view of a panel used in the large scale structure and in accordance with the concepts of the present invention.
Figure 4:
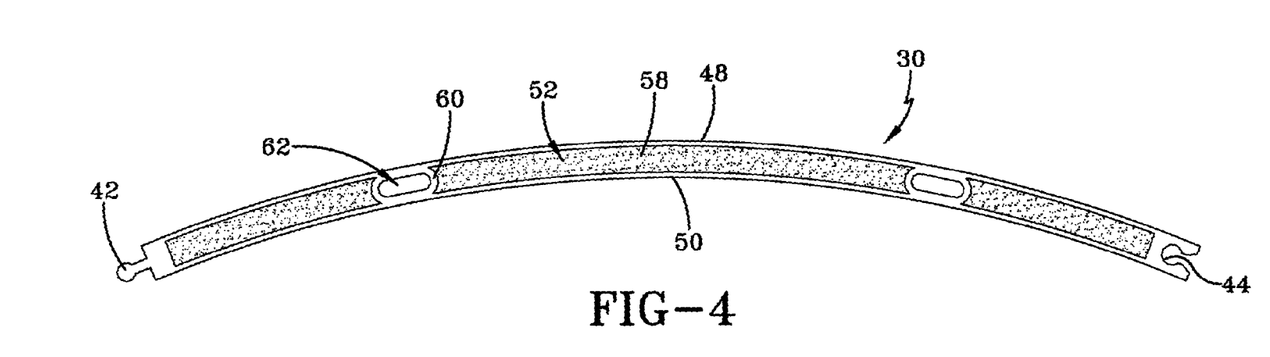
FIG. 4 is a top view of the panel show in FIG. 3.

As best seen in FIGS. 3 and 4, the panel 30 is of a curvilinear or arcuate shape. In most embodiments the panel 30 is of a pultrusion construction although other variations of the panel may be constructed. As is commonly understood in the art, a pultrusion is a composite structure using composite sandwich panels. In addition to pultrusion variations, a composite structure may be configured by hand layup, resin transfer molding, vacuum assisted transfer molding, compression molding or filament winding. As is commonly understood, a pultrusion process is where reinforced fibers are pulled through a resin and then a preforming system, such as a heated die wherein the resin undergoes polymerization. Pultrusion may utilize various materials such as polyester, polyurethane, vinylester, and/or epoxy.

Figure 13:
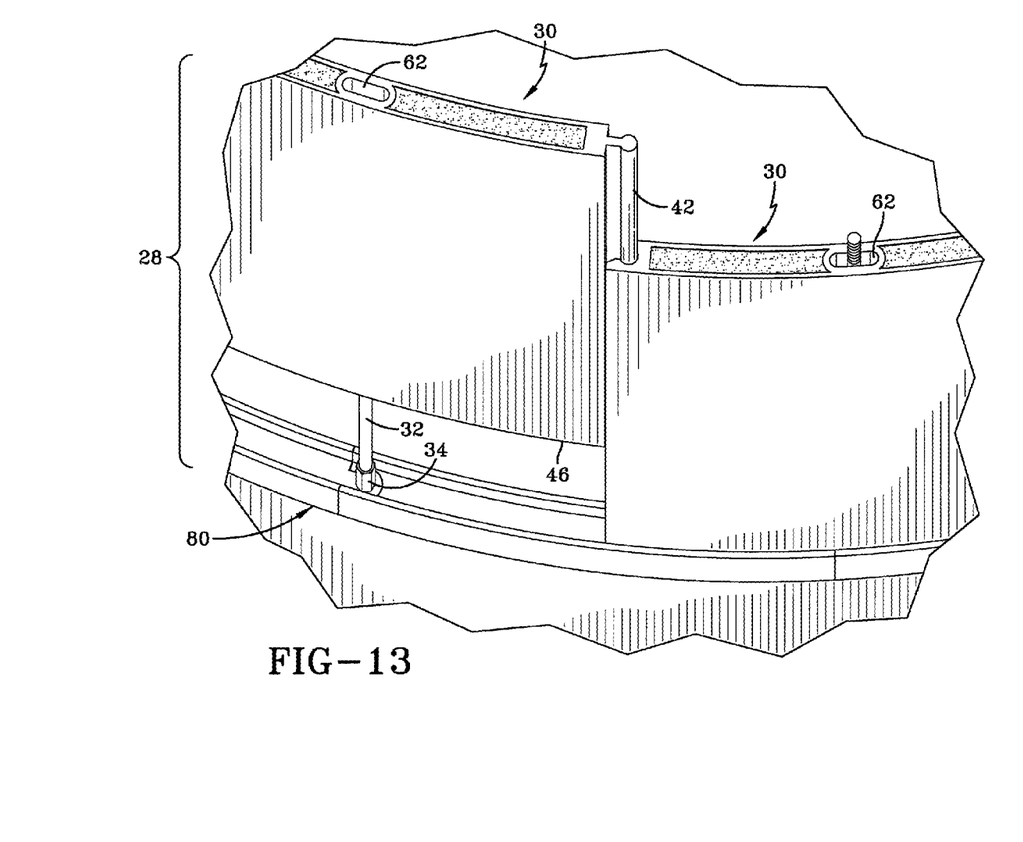
FIG. 13 is a partial perspective view showing assembly of the panels to one another and to an insert according to the concepts of the present invention.

Each panel 30 provides a tongue edge profile 42 on one side and a groove edge profile 44 on an opposite side. When panels are placed adjacent one another the grooved edged profile of one panel receives the tongue edge profile of the other panel as best seen in FIG. 13. Of course, other mating configurations of edge profiles 42 and 44 may be implemented depending on a particular end use or structural requirement. Each panel 30 has an external surface 48 opposite an internal surface 50. Depending upon the particular type of process used to manufacture the panel, a plurality of voids 52 may be provided between the surfaces 48 and 50. In some embodiments of the structure, the voids 52 are filled with an elastic or foam material 58 to improve the strength and durability of the panel and the completed structure. Also disposed between the surfaces 48 and 50 are internal reinforcing members 60 which provide an opening 62 extending all the way therethrough. As will be discussed in further detail, the opening 62 receives the rod 32 to facilitate interconnection between the panels and the sections. When assembled together, the panel, the rod and coupling nut form a rod-panel sub-assembly.

Figures 5, 6:
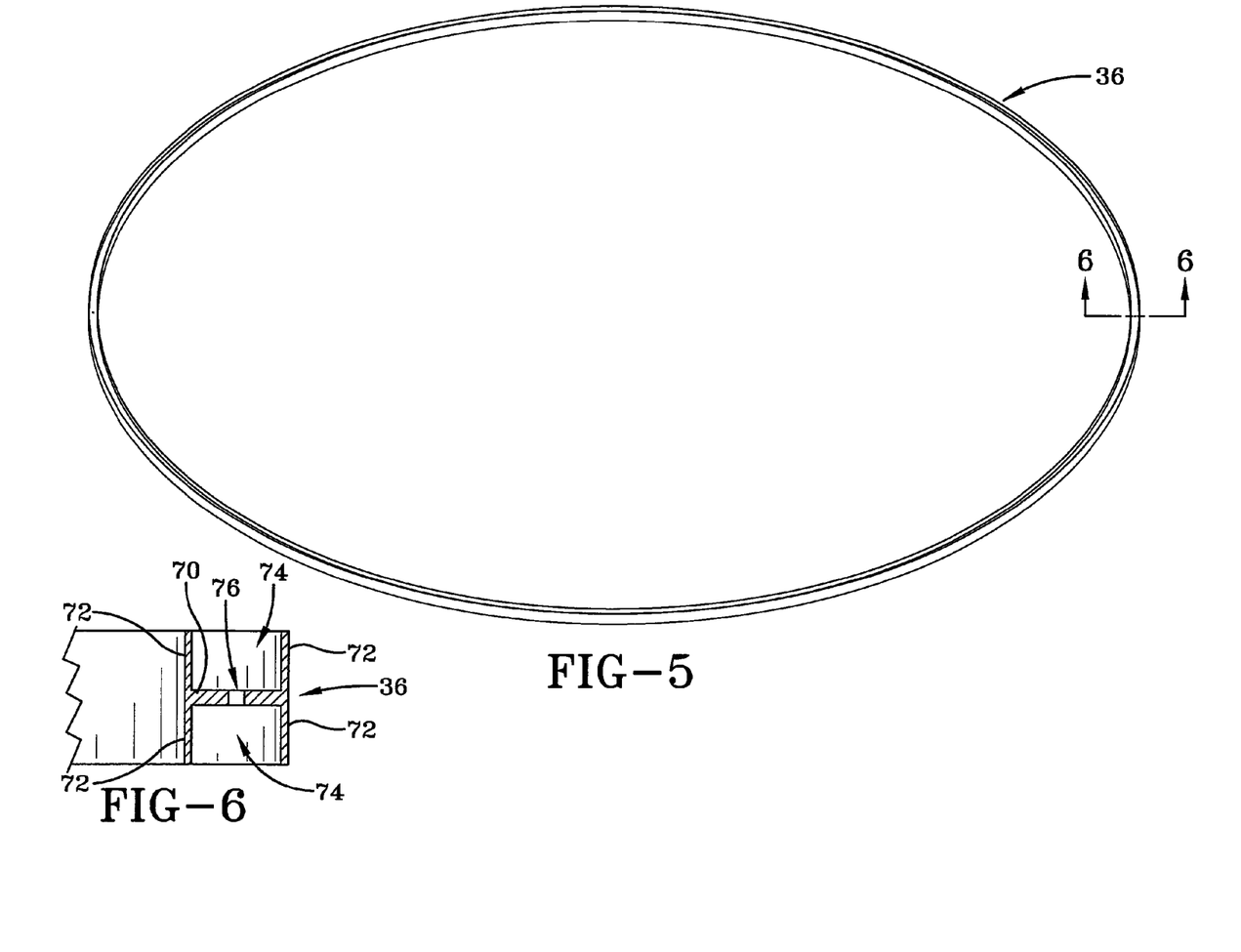
FIG. 5 is a perspective view of an insert used in the large scale structure according to the concepts of the present invention.
FIG. 6 is a partial cross-sectional view of the insert taken along lines 6-6 of FIG. 5.

As best seen in FIGS. 5 and 6, the insert 36 is a circular configuration which may be a single piece but in most embodiments will likely be a plurality of pieces. It will further be appreciated that a circular structure is used for the insert when configuring tubular structures but the insert may be any shape appropriate for the shape of the final structure to be configured. As best seen in FIG. 6, the insert 36 provides a base 70 from which perpendicularly extends flange members 72 in both directions. Opposed flange members 72 and base 70 form a channel 74 on either side of the base 70. Extending through the base 70 is an aperture 76 which is alignable with one of the panel openings 62. Each channel 74 receives an end 46 of the panel 30. As such, the flange members 72 function to laterally retain the end 46 of each panel received therein.

Figures 7, 8:
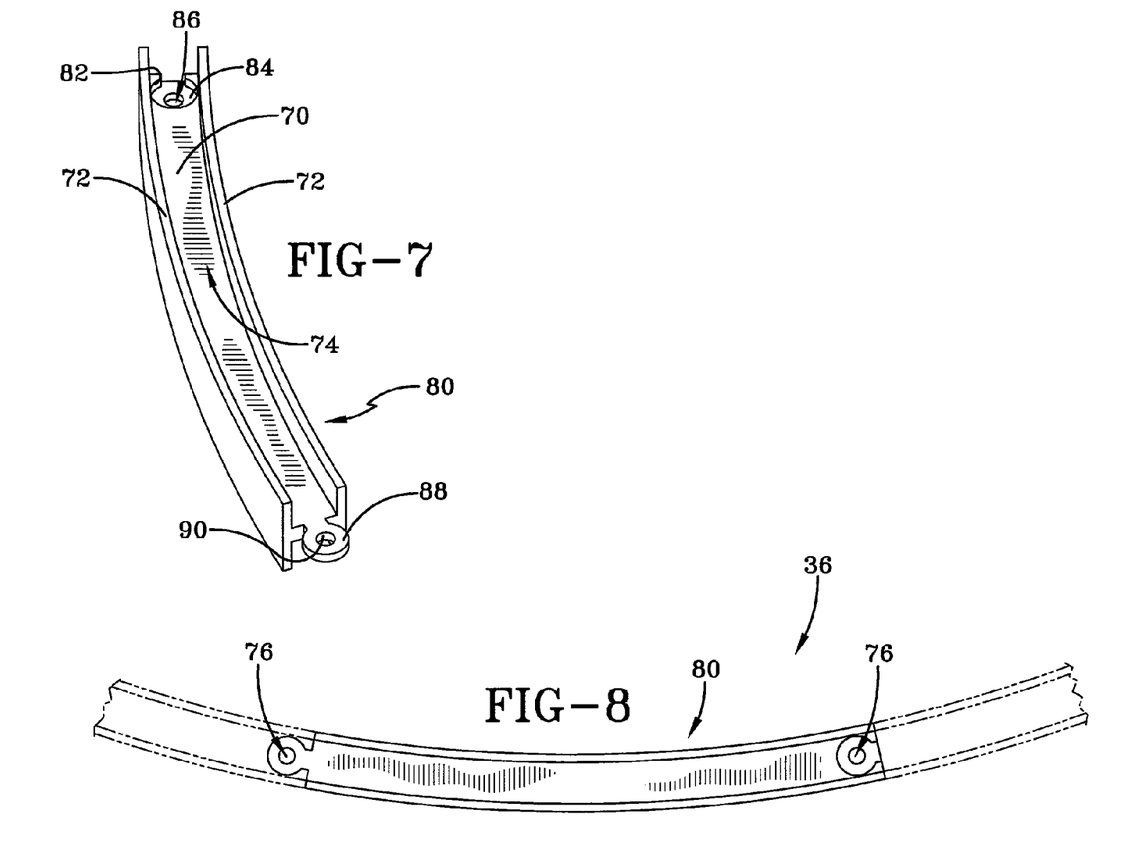
FIG. 7 is a perspective view of an arcuate member used to form the insert in accordance with the concepts of the present invention.
FIG. 8 is a partial assembly view of the arcuate member shown assembled to other arcuate members in accordance with the concepts of the present invention.

As best seen in FIGS. 7 and 8, a plurality of arcuate members 80 can be configured to construct the insert 36. Each arcuate member 80 is sized to have an arcuate distance equal to the arcuate distance between adjacent panel openings. Each arcuate member 80 has a recess 82 formed in the base 70 wherein the recess forms an internal eyelet 84 at one end and which provides an eyelet hole 86 therethrough. At an opposite end of the arcuate member 80 is an extending eyelet 88 which has an eyelet hole 90 extending therethrough. Accordingly, the arcuate members 80 may be positioned end-to-end such that the extending eyelet 88 overlaps an internal eyelet 84 of an adjacent arcuate member. Moreover, the extending eyelet 88 is received in the recess 82. As a result, the eyelet holes 86 and 90 are aligned with one another and the aligned eyelet holes are also alignable with the opening 62 of a corresponding panel.

Figure 9:
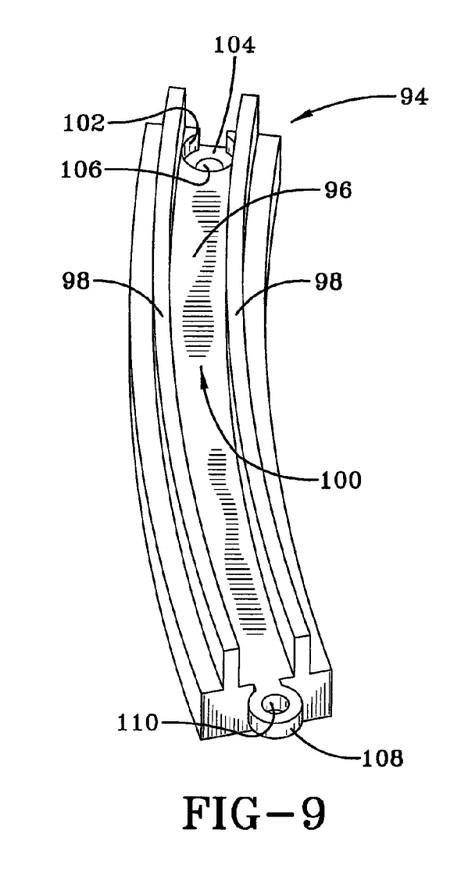
FIG. 9 is a perspective view of an arcuate end piece member used to form an end piece in accordance with the concepts of the present invention.

As best seen in FIG. 9, an end piece arcuate member 94 is shown with a similar configuration as the arcuate member 80. The end piece also provides a base 96 but with only two flanges extending perpendicularly therefrom, wherein both flanges 98 extend in the same direction. The flanges 98 and base 96 form a channel 100 so as to receive an end of a panel 30. And in a manner similar to the arcuate member 80, the arcuate member 94 provides a recess 102 which provides an internal eyelet 94 with a hole 106 therethrough and the opposite end of the arcuate member provides an extending eyelet 108 with a hole 110 extending therethrough. As such, adjacent arcuate members 94 are aligned such that the eyelets overlap one another and the holes 106 and 110 are aligned with an opening 62. And the extending eyelet 108 is received in the recess 102.

Figure 10:
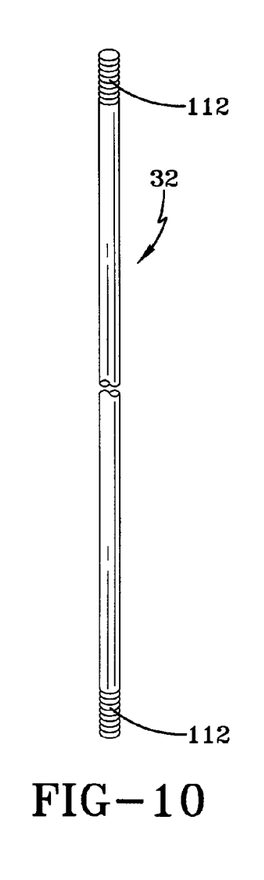
FIG. 10 is a perspective view of a rod used in the large scale structure according to the concepts of the present invention.

As seen in FIG. 10, a rod 32 is provided with threaded ends 112. The rod 32 is typically made of a strengthened steel alloy which is able to withstand stresses and strains and which is also lightweight. Of course, other structural materials could be used for the rod 32.

Figure 11:
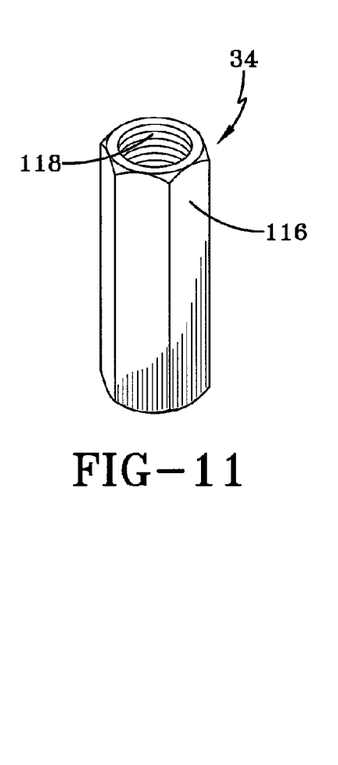
FIG. 11 is a perspective view of a coupling nut used in accordance with the concepts of the present invention.

As best seen in FIG. 11, a coupling 34 provides a non-circular exterior 116 such as a hex or square configuration. This allows for gripping and rotation of the nut 34 so that the rods and panels can be secured to one another. The nut 34 provides internal threads 118 which receive and mate with the threaded ends 112 of the rod 32.

Figure 2:
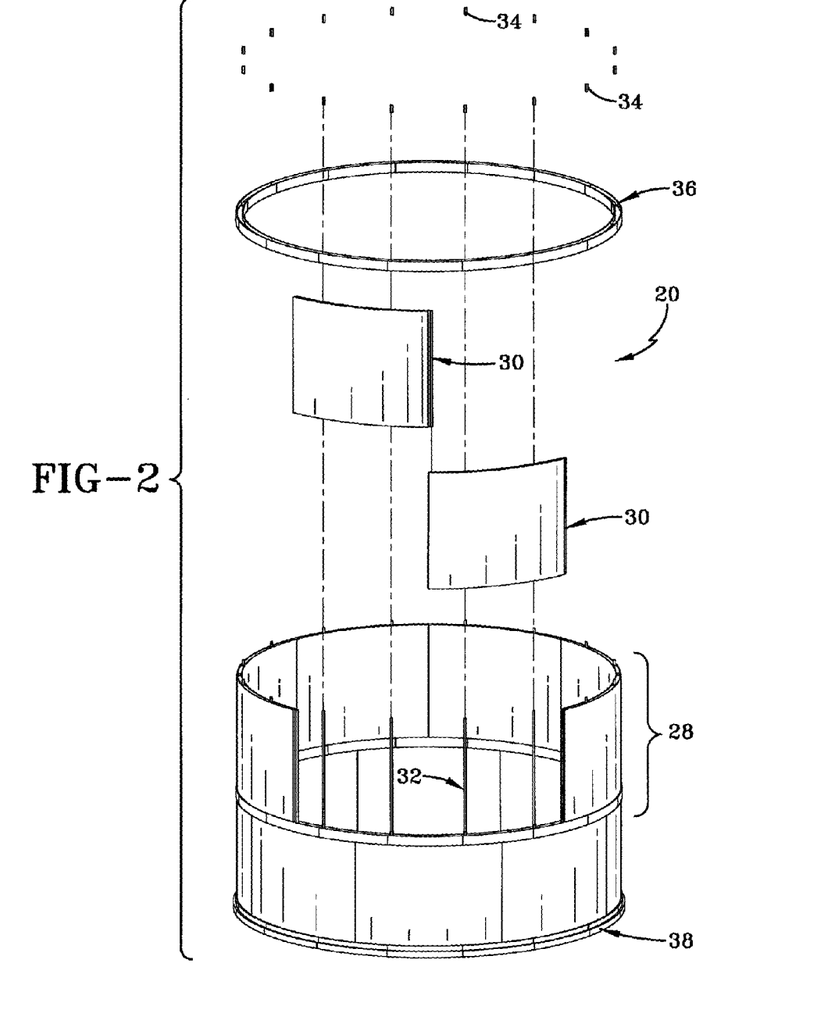
FIG. 2 is an assembly perspective view of the large scale structure made in accordance with the concepts of the present invention.
Figure 12:
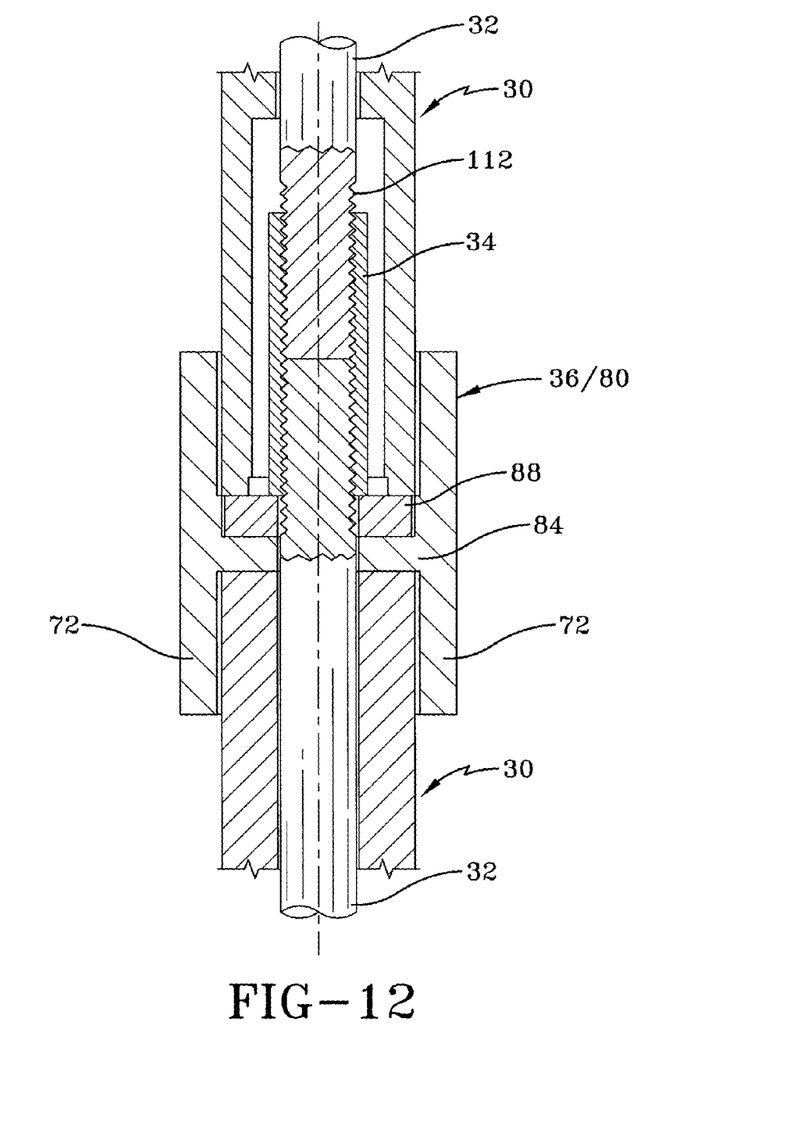
FIG. 12 is a partial cross-sectional view showing interconnection between panels according to the concepts of the present invention.

As best seen in FIGS. 2, 12 and 13, the components described above can be interconnected to one another. Initially, a number of rods are pre-assembled such that a coupling nut 34 is attached to one end of each rod 32. The pre-assembled rods are then inserted through the openings 76 of the insert 36 and/or the eyelet holes 86/90 of the assembled arcuate members or end piece arcuate members as appropriate. After this step is complete, a panel 30 is aligned over and then directed on to the rods 32 such that the rods are received in the respective openings 62. Once a first panel has been installed such that the end 46 is received in the channel 74, a second adjacent panel is installed and configured such that the tongue edge profile 42 of one panel is received in the groove edge profile 44 of an adjacent panel. It will be appreciated that the profiles are sized to allow for ease of assembly. If desired, appropriate adhesives and/or lubricants may be used to assemble and secure the edge profiles 42 and 44 to one another during assembly or afterwards. Likewise, the channels 74 formed by the insert may also receive adhesive so as to secure the end of the panel when it is fully assembled. The assembly of the panels is repeated until each edge profile is mated with an adjacent edge profile. Once all the ends 46 are received within the channel 74, it will be appreciated that an end of each rod 32 extends outwardly therefrom. At this time, a coupling nut 34 is secured to the threaded end of the rod such that the compressive force obtained by tightening of the coupling nut to the threaded rod seats the lower end of the respective panel 30 into the channel 74 of the insert 36. This is performed for each installation of the panel and upon completion of a section 28 another layer of arcuate members 80 or an insert 36 may be assembled over the exposed edge and the process is repeated until the tubular structure is configured for the desired length or finished assembly.

Figure 14:
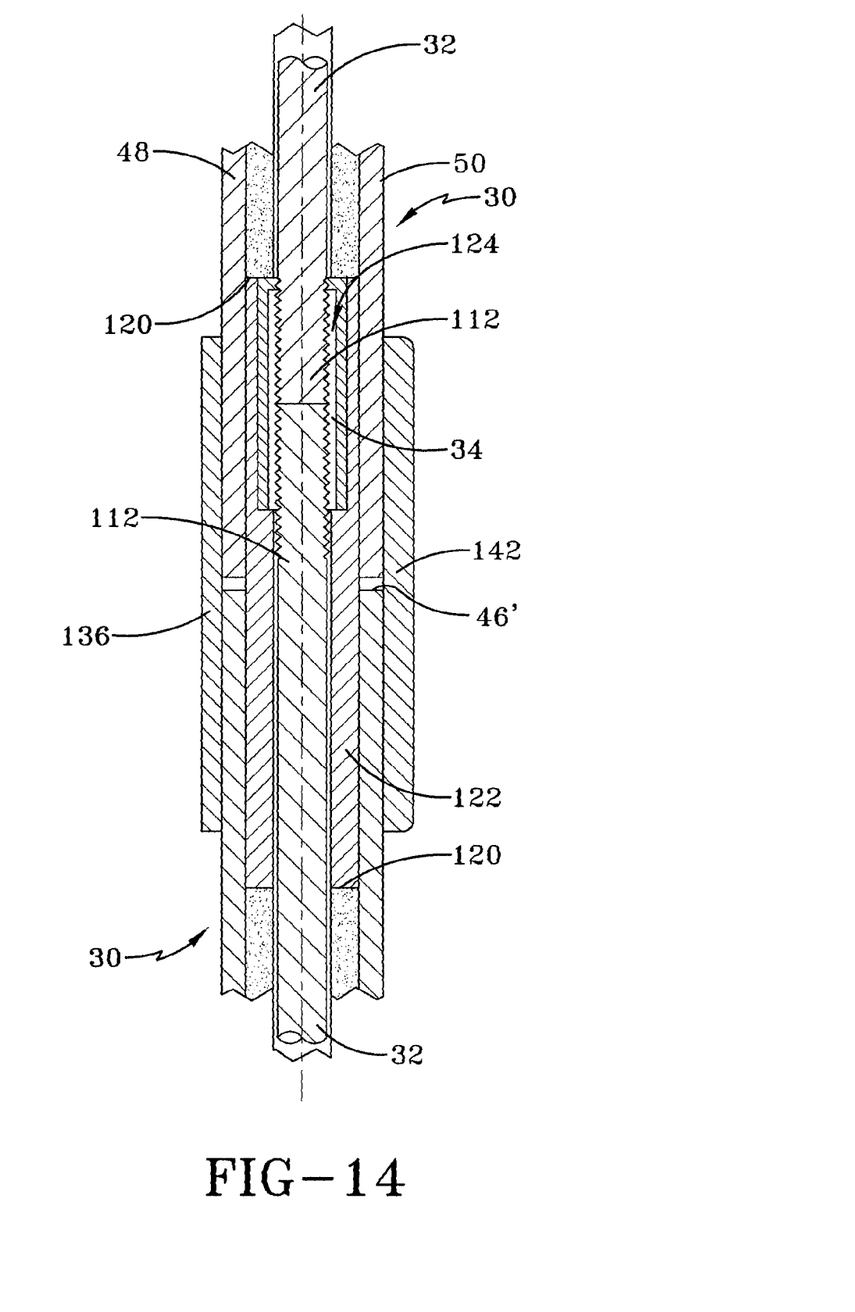
FIG. 14 is a partial cross-sectional view according to an alternative embodiment showing connection of panels to one another using a rod and coupling nut.
Figure 15:
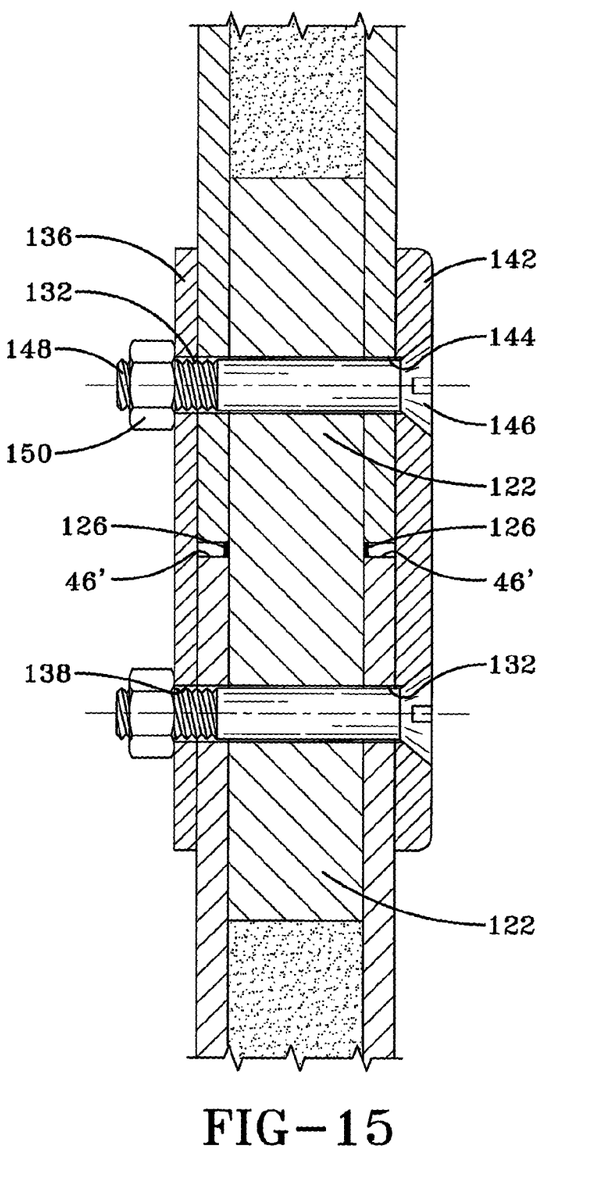
FIG. 15 is a cross-sectional view of panels connected to one another in an alternative embodiment wherein the end profiles receive a biscuit-type insert and are interconnected to one another utilizing a backing plate and a compression plate.

Referring now to FIGS. 14 and 15, it will be appreciated that an alternative embodiment for securing the panels to one another while still providing use of rods for interconnection is provided. In FIG. 14, each panel end profile 46' is modified such that a connection slot 120 is formed at least in a general area of the opening 62 along both ends 48 of the panel. In other embodiments, the slot 120 may extend the entire length of each end 48.

A biscuit insert 122 is received in the slot 120. The insert 122 may be provided in segments or as a single-piece construction. A top edge of the insert provides counter-bores 124 that are aligned with corresponding openings 62. As such, when the panels are assembled on to and over respective rods, the threaded end 112 extends into the counter-bore 124. Next, in a manner similar to the original embodiment, the coupling nut 34 is tightened upon and engages the biscuit insert at a bottom surface of the counter-bore and as a result secures the panel underneath to the other sections below. The counter-bore is sized to allow rotatable movement of the coupling nut as needed. And, as in the previous embodiment, a next rod is received in the other end of the coupling nut and secured so as to allow for receipt of another panel adjacent thereto. If desired, adhesive can be used to further secure the biscuit insert 122 to the adjacent panel 30. Use of the biscuit insert 122 may provide advantages to the overall structure by providing improved internal reinforcement at the panel ends as compared with other embodiments.

To further secure the panels to one another, and as best seen in FIG. 15, a panel cross-hole 132 extends through the panels and near the panel ends 48. The holes 132 may be drilled through the panel at the off-site factory or at the assembly site. A backing plate 136 and a compression plate 142 may be assembled at the edges of the respective panels wherein the backing plate 136 has at least one backing plate hole 138 extending therethrough and, in a similar manner, the compression plate 142 has a compression plate hole 144 also extending therethrough. The holes 132, 138 and 144 are alignable with one another so as to receive a fastener 146 which has a threaded end 148. A nut 150 is then used to compress the plates to one another so as to further secure the ends of the panels to one another as shown in FIG. 15. In some embodiments, the plates 136 and 142 may receive only two fasteners and be intermittently placed about the structure. In other embodiments, the plates may extend fully around the structure and use any number of fasteners.

Figure 16A:
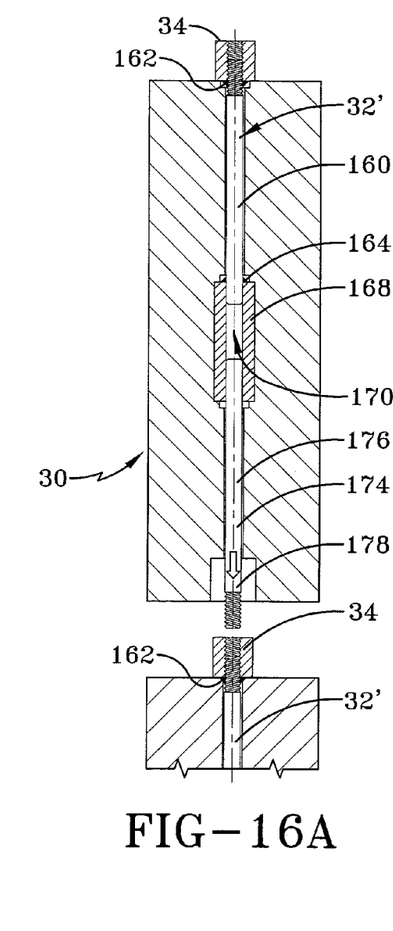
FIGS. 16A-C illustrate a method of assembly utilizing a rod-assembly that incorporates a mid-span coupler to facilitate interconnection of panels to one another according to the concepts of the present invention.
Figure 16B:
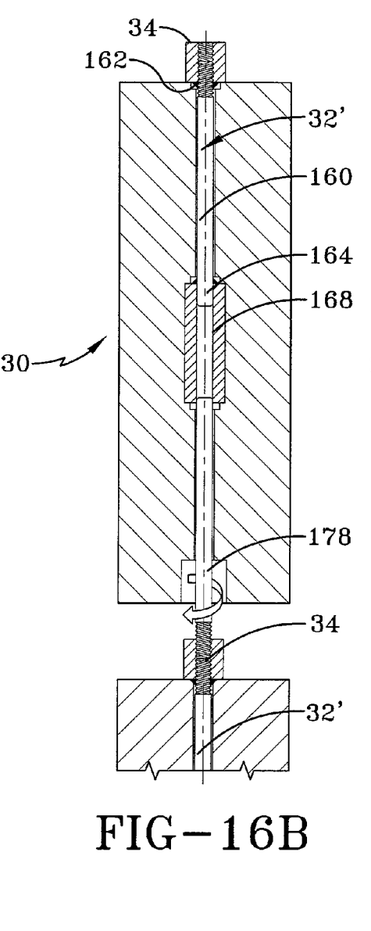
Figure 16C:
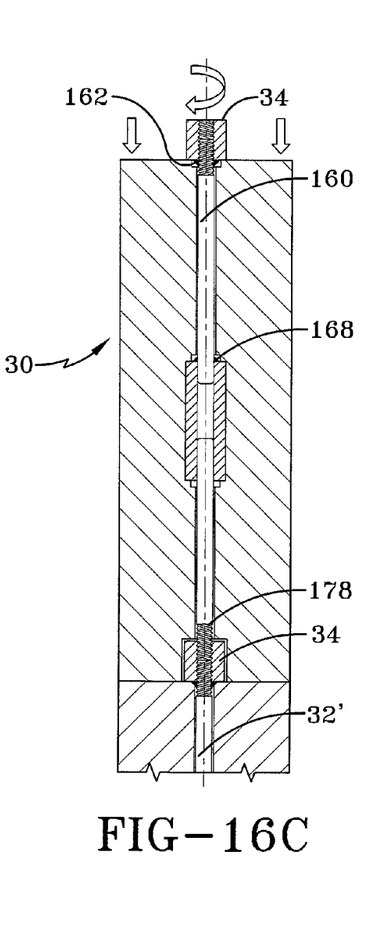

FIGS. 16A-C show an alternative embodiment for connecting panels 30 to one another. In this embodiment, an insert ring as shown in the previous embodiments could be used or, in the alternative and with appropriate modifications, a biscuit insert 122 could be used. In this embodiment, the rod 32 is replaced by a modified rod assembly 32'. Moreover, the modified rod assembly 32' may be pre-assembled and shipped together with the panel 30. Whether pre-assembled or not, a fixed rod 160 has a nut end 162 which is secured to a coupling nut 34. A mid-span end 164 of the rod 160 is secured, such as by welding, to a mid-span coupler 168 which is positioned at about a midpoint of the opening 62 that extends through the panel. The mid-span coupling 168 has a socket in the form of a coupler hole 170 extending therethrough which receives at one end the fixed rod 160 and at an opposite end an adjustable rod 174. The adjustable rod 174 is slidably movable within the coupler hole 170 and allows for precise positioning of the rod assembly 32' within the panel so as to allow for easy connection of the threaded adjustable coupler end 178 of the adjustable rod 174 in a corresponding coupling nut 34. Accordingly, as best seen in FIG. 16A, one end of the adjustable rod 174 is substantially inserted into the coupler hole 170 while the adjustable coupler end 178 is aligned and positioned proximal an underlying coupling nut 34 that is supported by an underlying panel. As the end 178 is mated with the coupling nut 34, as shown in FIG. 16B, the adjustable rod end 174 extends downwardly from the coupler hole 170 but is still retained thereby. When the adjustable coupler end 178 is fully mated with the coupling nut, then the remainder of the rod assembly is moved downwardly so as to secure the adjacent panels to one another as shown in FIG. 16C.

Based upon the foregoing description of the structure of the structure 20 and its method of assembly, it can be seen that a "brick and mortar" approach to constructing composite tubes is provided. The composite structure that uses internal rods may be implemented to create an infinite length of structure. The rods, by employing a coupling nut and rod configuration, allow for a tooling feature that facilitates the design for butt joint inserts. Such a configuration provides for axial rigidity to allow the finished structure to withstand various stresses encountered in various environments. Moreover, the rod voids could be filled with elastic material to provide lateral flexibility. Moreover, internal couplers can be used to extend the rods to facilitate assembly.

Yet another advantage of the present structure and its method of assembly allows for a composite structure that incorporates interlocking seam joints with butt joints that are secured under compression. It will be noted that seam joints are adaptable to either be a sliding fit or a snapping fit which may or may not employ adhesive. Such a configuration can be applied for any composite structure that uses a composite sandwich panel construction. The present configuration is also advantageous in that it allows for rapid field assembly in that the panels can be sent to the field fully cured and ready for assembly as opposed to other processes which require curing of the panels on site.

Thus, it can be seen that the objects of the invention have been satisfied by the structure and its method for use presented above. While in accordance with the Patent Statutes, only the best mode and preferred embodiment has been presented and described in detail, it is to be understood that the invention is not limited thereto or thereby. Accordingly, for an appreciation of the true scope and breadth of the invention, reference should be made to the following claims.

What is claimed is:

1. A large scale structure comprising:
    a plurality of panels, each said panel of said plurality of panels having opposed edge profiles that are positionable next to adjacent panels of said plurality of panels, and each said panel of said plurality of panels having opposed end profiles that are positionable next to adjacent panels of said plurality of panels, and each said panel of said plurality of panels having at least one panel opening therethrough extending from one said end profile to the other said end profile, and wherein adjacent panel openings are aligned with each other;
    a plurality of rods extendable through said aligned panel openings;
    a plurality of coupling nuts, each said coupling nut attachable to an end of one of said rods so as to secure said plurality of panels to one another; and
    a plurality of inserts, each said insert of said plurality of inserts having an internal eyelet at one end and an extending eyelet at an opposite end, wherein said extending eyelet overlaps said internal eyelet of an adjacent insert such that one of said plurality of rods is receivable through said overlapping eyelets and said aligned panel openings.

2. The structure according to claim 1, wherein each said eyelet has an aperture extending therethrough and alignable with said at least one panel opening, each said rod extendable through said aligned panel openings and apertures so as to connect said insert to said plurality of panels.

3. The structure according to claim 2, wherein each said rod has threaded ends and each said coupling nut is internally threaded to mate with said threaded ends.

4. The structure according to claim 2, wherein each said insert is formed from a number of accurate members so that said insert interfits with said panel end profiles on either side of said insert.

5. The structure according to claim 4, wherein said insert has a base with flanges extending substantially perpendicularly therefrom so as to form an insert channel, wherein said end profiles are receivable in said insert channel.

6. The structure according to claim 5, wherein said base has said internal eyelet at one end and said extending eyelet at an opposite end, wherein said extending eyelet overlaps said internal eyelet of an adjacent insert and wherein said coupling nut secures said adjacent inserts to said panel supporting said inserts.

7. The structure according to claim 1, further comprising:
    at least one insert receivable in said end profiles of adjacent panels, said at least one insert having at least one cross-aperture extending therethrough, each said panel having at least one cross-hole therethrough proximal said panel end profiles and alignable with said at least one cross-aperture;
    a backing plate having at least one backing plate hole therethrough and alignable with said at least one cross-hole and said at least one cross-aperture;
    a compression plate having at least one compression plate hole therethrough and alignable with said at least one backing plate hole, said at least one cross-hole and said at least one cross-aperture; and
    a bolt received through each of said aligned compression plate hole, backing plate hole, cross-hole and cross-aperture, and a fastener secured to said bolt so as to secure adjacent panels to said at least one insert.

8. The structure according to claim 2, wherein each said panel of said plurality of panels is curved and a plurality of said curved panels form a tubular section that interfits with said at least one insert adjacent said end profiles of said plurality of curved panels.

9. The structure according to claim 1, wherein each said panel of said plurality of panels has a first edge profile opposite a second edge profile, wherein said first edge profile of one panel of said plurality of panels interfits with said second edge profile of another panel adjacent said one panel of said plurality of panels.

10. The structure according to claim 1, wherein each said panel of said plurality of panels has voids filled with elastic material.

11. The structure according to claim 1, wherein each said rod comprises:
    a secured rod section having one of said coupling nuts secured to one end;
    a mid-span coupler having a socket at one end and said secured rod section secured to an opposite end; and
    an unsecured rod section having one end receivable in said socket and an opposite end receivable in and securable to one of said coupling nuts secured to a previously assembled panel.

* * * * *